(12) United States Patent
Matsubara et al.

(10) Patent No.: US 12,194,918 B2
(45) Date of Patent: Jan. 14, 2025

(54) VEHICLE INTERIOR LIGHTING DEVICE

(71) Applicant: TOYOTA JIDOSHA KABUSHIKI KAISHA, Toyota (JP)

(72) Inventors: Norihiro Matsubara, Toyota (JP); Toshiya Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/135,262

(22) Filed: Apr. 17, 2023

(65) Prior Publication Data
US 2023/0339389 A1    Oct. 26, 2023

(30) Foreign Application Priority Data
Apr. 20, 2022 (JP) ................. 2022-069687

(51) Int. Cl.
*B60Q 3/217* (2017.01)
*F21S 8/00* (2006.01)
*F21W 106/00* (2018.01)

(52) U.S. Cl.
CPC ............. *B60Q 3/217* (2017.02); *F21S 8/00* (2013.01); *F21W 2106/00* (2018.01)

(58) Field of Classification Search
CPC ........ B60Q 3/217; F21S 8/00; F21W 2106/00
See application file for complete search history.

(56) References Cited

U.S. PATENT DOCUMENTS

| | | | |
|---|---|---|---|
| 7,710,243 B2 * | 5/2010 | Akatsuka ............... | B60Q 9/008 340/439 |
| 10,555,396 B1 * | 2/2020 | Sugiura ................... | B60Q 3/80 |
| 10,780,820 B1 * | 9/2020 | Gold ....................... | B60Q 9/00 |
| 11,679,715 B2 * | 6/2023 | Matsumura ............. | B60Q 3/12 362/511 |
| 2002/0145879 A1 * | 10/2002 | Yamanaka ............... | B60Q 3/12 362/494 |
| 2004/0228136 A1 * | 11/2004 | Bos ......................... | B60Q 3/80 362/494 |
| 2006/0034092 A1 * | 2/2006 | Okazaki .................. | B60Q 3/12 362/489 |
| 2006/0163590 A1 * | 7/2006 | Erchak .................... | H01L 24/24 257/E33.059 |
| 2006/0290479 A1 * | 12/2006 | Akatsuka ............... | B60Q 9/008 340/425.5 |
| 2008/0049435 A1 * | 2/2008 | Yoshihara ............... | F21V 29/74 362/488 |

(Continued)

FOREIGN PATENT DOCUMENTS

| | | | | |
|---|---|---|---|---|
| EP | 1625971 A2 * | 2/2006 | ............. | B60Q 3/12 |
| JP | S64-022549 U | 2/1989 | | |

(Continued)

*Primary Examiner* — Chico A Foxx
(74) *Attorney, Agent, or Firm* — Dinsmore & Shohl LLP

(57) ABSTRACT

A vehicle interior lighting device includes a plurality of front light-emitting sections that are provided at a front side of a passenger compartment and illuminate front portions of front interior components disposed on right and left sides at the front side of the passenger compartment, and a plurality of rear light-emitting sections that are provided at a rear side of the passenger compartment and illuminate rear portions of rear interior members disposed on right and left sides at the rear side of the passenger compartment.

11 Claims, 9 Drawing Sheets

(56) References Cited

U.S. PATENT DOCUMENTS

| | | | | |
|---|---|---|---|---|
| 2009/0179447 A1* | 7/2009 | Woodhouse | ............ | B60N 3/104 |
| | | | | 296/65.01 |
| 2010/0128493 A1* | 5/2010 | Hipshier | ................... | B60R 7/04 |
| | | | | 362/501 |
| 2010/0214795 A1* | 8/2010 | Salter | .................... | B60Q 3/233 |
| | | | | 362/488 |
| 2012/0188787 A1* | 7/2012 | Schultz | ................... | B60R 13/02 |
| | | | | 362/555 |
| 2013/0242581 A1* | 9/2013 | Ukai | ....................... | B60Q 3/64 |
| | | | | 362/459 |
| 2014/0226303 A1* | 8/2014 | Pasdar | ................... | B60Q 3/18 |
| | | | | 362/23.08 |
| 2014/0355287 A1* | 12/2014 | Sohizad | ................... | B60Q 3/78 |
| | | | | 362/545 |
| 2015/0203029 A1* | 7/2015 | Oba | ........................ | B60Q 3/76 |
| | | | | 362/466 |
| 2016/0075276 A1* | 3/2016 | Sugimoto | ............... | B60Q 3/76 |
| | | | | 362/543 |
| 2016/0082881 A1* | 3/2016 | Yamato | ................... | B60Q 3/54 |
| | | | | 362/511 |
| 2016/0101724 A1* | 4/2016 | Alanis | ................... | B60Q 3/252 |
| | | | | 362/546 |
| 2016/0185289 A1* | 6/2016 | Shibata | ................. | B60Q 3/275 |
| | | | | 362/253 |
| 2017/0182936 A1* | 6/2017 | Kawamata | ............... | B60Q 3/78 |
| 2017/0225613 A1* | 8/2017 | Ohashi | .................... | G02B 6/00 |
| 2017/0282789 A1* | 10/2017 | Ohashi | ................... | B60Q 3/225 |
| 2018/0031756 A1* | 2/2018 | Harada | ................... | G02B 6/0051 |
| 2018/0257558 A1* | 9/2018 | Berlitz | .................... | B60Q 1/381 |
| 2019/0001874 A1* | 1/2019 | Verwys | ................... | B60Q 3/745 |
| 2019/0084422 A1* | 3/2019 | Iwao | ...................... | B60K 35/60 |
| 2019/0168666 A1 | 6/2019 | Nomura | | |
| 2019/0225144 A1* | 7/2019 | Takenaka | ................ | B60Q 3/50 |
| 2020/0298534 A1* | 9/2020 | Berard | .................... | B60Q 3/51 |
| 2020/0398746 A1* | 12/2020 | Schmitz | .................. | B60Q 3/62 |
| 2022/0032841 A1* | 2/2022 | Le Corre | ................ | B60Q 3/78 |
| 2022/0252962 A1* | 8/2022 | Suto | ........................ | B60Q 3/70 |
| 2023/0022634 A1* | 1/2023 | Fuwamoto | ............ | B60K 35/26 |
| 2023/0256795 A1* | 8/2023 | Numajiri | ................. | B60Q 3/54 |
| | | | | 296/146.6 |
| 2023/0302182 A1* | 9/2023 | Kim | ........................ | H05B 47/115 |
| 2023/0398930 A1* | 12/2023 | Dunkel | .................... | B60Q 3/74 |
| 2024/0059217 A1* | 2/2024 | Bizal | ........................ | B60Q 3/51 |

FOREIGN PATENT DOCUMENTS

| | | | | |
|---|---|---|---|---|
| JP | H08-080782 A | 3/1996 | | |
| JP | 2015-182567 A | 10/2015 | | |
| JP | 2018-016290 A | 2/2018 | | |
| JP | WO2016/208388 A1 | 4/2018 | | |
| JP | 2019-137098 A | 8/2019 | | |
| WO | WO-2013118394 A1 * | 8/2013 | ............ | B60N 2/0705 |
| WO | WO-2016059225 A2 * | 4/2016 | ............ | B60Q 3/004 |
| WO | WO-2019074023 A1 * | 4/2019 | ............... | A47C 7/46 |

\* cited by examiner

VEHICLE INTERIOR LIGHTING DEVICE

CROSS REFERENCE TO RELATED APPLICATION

This application claims priority to Japanese Patent Application No. 2022-069687 filed on Apr. 20, 2022, which is incorporated herein by reference in its entirety including the specification, claims, drawings, and abstract.

TECHNICAL FIELD

The present disclosure relates to a structure of a vehicle interior lighting device.

BACKGROUND

There have been recently proposed interior lighting devices that produce a visual sensation as if the interior of a passenger compartment were expanded. For example, there has been proposed a vehicle interior lighting device comprising a strip-shaped light guide body which includes a partial reflective surface on the passenger compartment interior side, an opposing total reflective surface, and an incident angle modifying element in an integrated manner (see, for example, JP 2019-137098 A). The light guide body is mounted on a side surface of a door, and light emitting means mounted on one end of the light guide body emits light through the entire light guide body into the passenger compartment.

There have been also proposed a light guide that propagates light incident from its one end internally and leaks light from its side surface, and a lighting device that scatters LED light incident from the side surface of the light guide and causes the side surface of the light guide to emit light (see, for example, JP 2015-182567 A).

CITATION LIST

PATENT DOCUMENT 1: JP 2019-137098 A
PATENT DOCUMENT 2: JP 2015-182567 A

SUMMARY

In recent years, there has been a demand not only to produce the visual sensation as if the interior of the passenger compartment were expanded, but also to produce a space in which passengers can feel comfortable and relaxed. However, there remains room for improvement in producing such a space with conventional lighting devices.

An objective of the present disclosure is therefore to provide a vehicle interior lighting device that produces a space in which passengers can feel comfortable and relaxed and allows the passengers to perceive visually the expanse of the interior of the passenger compartment.

A vehicle interior lighting device according to the present disclosure includes a plurality of front light-emitting sections that are provided at a front side of a passenger compartment and illuminate front portions of front interior components disposed on right and left sides at the front side of the passenger compartment, and a plurality of rear light-emitting sections that are provided at a rear side of the passenger compartment and illuminate rear portions of rear interior components disposed on right and left sides at the rear side of the passenger compartment.

By illuminating the four corners of the passenger compartment in this way, front and rear illuminated areas on the right and left sides of the passenger compartment provide the passengers with a visual sensation as if the interior of the passenger compartment were expanded in the vehicle front-and-rear direction. The right and left illuminated areas at the front side of the passenger compartment and the right and left illuminated areas at the rear side of the passenger compartment also provide the passengers with a visual sensation as if the interior of the passenger compartment were expanded in the vehicle width direction. It is thus possible to provide the passengers with a visual sensation as if the entire interior of the passenger compartment were expanded. Indirect illumination of the four corners of the passenger compartment can also produce a space in which passengers can feel comfortable and relaxed.

In the vehicle interior lighting device according to the present disclosure, the front light-emitting sections are disposed at right and left side ends of an interior trim provided at the front side of the passenger compartment and emit light obliquely outward toward the vehicle rear side to illuminate the front portions of the front interior components, and the rear light-emitting sections are disposed at the vehicle rear side of the rear interior components and emit light obliquely outward toward the vehicle front side to illuminate the rear portions of the rear interior components.

This structure enables provision, on the right and left sides of the passenger compartment, front illuminated areas extending from the front toward the rear on the front portions of the front interior components and rear illuminated areas extending from the rear toward the front on the rear portions of the rear interior components. This allows the passengers to perceive visually the expanse of the interior of the passenger compartment in the vehicle front-and-rear direction. Indirect illumination of the inside of the passenger compartment also makes the passengers feel the interior of the vehicle as a comfortable and relaxing space.

In the vehicle interior lighting device according to the present disclosure, the front interior components may be front door trims mounted on the passenger compartment side of right and left front doors, and the rear interior components may be rear door trims mounted on the passenger compartment side of right and left rear doors.

As such, because the front portions of the right and left front door trims and the rear portions of the left and right rear door trims, which constitute the right and left sides of the passenger compartment, are illuminated, the passengers can perceive visually the expanse of the interior of the passenger compartment in the vehicle front-and-rear direction.

In the vehicle interior lighting device according to the present disclosure, the front door trim may include a front door trim body that constitutes an inner surface of a corresponding one of the right or left front doors of the passenger compartment and a front door decoration panel mounted on a passenger compartment side surface of the front door trim body, and the rear door trim may include a rear door trim body that constitutes an inner surface of a corresponding one of the right or left rear doors of the passenger compartment and a rear door decoration panel mounted on a passenger compartment side surface of the rear door trim body. The left front door decoration panel and the left rear door decoration panel may be arranged in alignment with each other in the vehicle front-and-rear direction, and the right front door decoration panel and the right rear door decoration panel may be arranged in alignment with each other in the vehicle front-and-rear direction. The front light-emitting sections may illuminate front portions of the front door decoration panels, and the rear light-emitting sections may illuminate rear portions of the rear door decoration panels.

As such, because the light-emitting sections illuminate the front portions of the front door decoration panels and the rear portions of the rear door decoration panels, which are aligned in the vehicle front-and-back direction, the front illuminated areas and the rear illuminated areas thus appear to extend in the vehicle front-and-back direction, and the passengers can have the visual sensation as if the interior of the passenger compartment were expanded in the vehicle front-and-rear direction.

In the vehicle interior lighting device according to the present disclosure, the rear light-emitting section may be mounted inside a vehicle rear portion of the rear door trim body located at the vehicle rear side of the rear door decoration panel and emit light obliquely outward toward the vehicle front side from a gap between the rear door decoration panel and the rear door trim body.

This enables provision of the rear illuminated areas extending from the rear toward the front on the rear portions of the rear door decoration panels without affecting the design of the interior of the passenger compartment.

In the vehicle interior lighting device according to the present disclosure, each of the front door decoration panel and the rear door decoration panel may be a strip-shaped component that is of higher reflectance than the front door trim body and the rear door trim body and extends in the vehicle front-and-rear direction.

As such, because strip-shaped illuminated areas are provided so as to extend in the vehicle front-and-rear direction on the right and left sides at the front and rear sides of the passenger compartment, the passengers can visually perceive the expanse of the passenger compartment in the vehicle front-and-rear direction more strongly.

In the vehicle interior lighting device according to the present disclosure, the interior trim may be an instrument panel disposed at the front side of the passenger compartment, and the instrument panel may have air outlet nozzles projecting at its right and left side ends toward the inside of the passenger compartment and mortise-shaped depressions provided in vehicle-width-direction outer-side portions of the air outlet nozzles. The mortise-shaped depression may be enlarged obliquely outward toward the vehicle rear side, and the front light-emitting sections may be light-emitting elements provided in the depressions.

This makes it possible to illuminate the front portions of the right and left front door decoration panels in a limited manner.

In the vehicle interior lighting device according to the present disclosure, the front light-emitting sections may be disposed at the vehicle front side of the front interior components and emit light obliquely outward toward the vehicle rear side to illuminate the front portions of the front interior components, and the rear light-emitting sections may be disposed at the vehicle rear side of the rear interior components and emit light obliquely outward toward the vehicle front side to illuminate the rear portions of the rear interior components.

This enables provision of front illuminated areas extending from the front toward the rear on the front portions of the front interior components on the right and left sides of the passenger compartment and provision of rear illuminated areas extending from the rear toward the front on the rear portions of the rear interior components. The passengers can thus visually perceive the expanse of the interior of the passenger compartment in the vehicle front-and-rear direction.

In the vehicle interior lighting device according to the present disclosure, the front interior components may be front door trims mounted on the passenger compartment side of right and left front doors, and the rear interior components may be rear door trims mounted on the passenger compartment side of right and left rear doors. The front door trim may include a front door trim body that constitutes an inner surface of a corresponding one of the right or left front doors of the passenger compartment and a front door decoration panel mounted on a passenger compartment side surface of the front door trim body. The rear door trim may include a rear door trim body that constitutes an inner surface of a corresponding one of the right or left rear doors in the passenger compartment and a rear door decoration panel mounted on a passenger compartment side surface of the rear door trim body. The left front door decoration panel and the left rear door decoration panel may be arranged in alignment with each other in the vehicle front-and-rear direction, and the right front door decoration panel and the right rear door decoration panel may be arranged in alignment with each other in the vehicle front-and-rear direction. The front light-emitting section may be mounted inside a vehicle front portion of the front door trim body located at the vehicle front side of the front door decoration panel and emit light obliquely outward toward the vehicle rear side from a gap between the front door decoration panel and the front door trim body to illuminate the front portion of the front door decoration panel. The rear light-emitting section may be mounted inside a vehicle rear portion of the rear door trim body located at the vehicle rear side of the rear door decoration panel and emit light obliquely outward toward the vehicle front side from a gap between the rear door decoration panel and the rear door trim body to illuminate the rear portion of the rear door decoration panel.

This enables provision of front illuminated areas extending from the front toward the rear on the front portions of the front door decoration panels and rear illuminated areas extending from the rear toward the front on the rear portions of the rear door decoration panels.

Therefore, the present disclosure can provide a vehicle interior lighting device that produces a space in which the passengers can feel comfortable and relaxed and allows the passengers to perceive visually the expanse of the interior of the passenger compartment.

BRIEF DESCRIPTION OF DRAWINGS

Embodiments of the present disclosure will be described based on the following figures, wherein.

DESCRIPTION OF EMBODIMENTS

Figure 1:
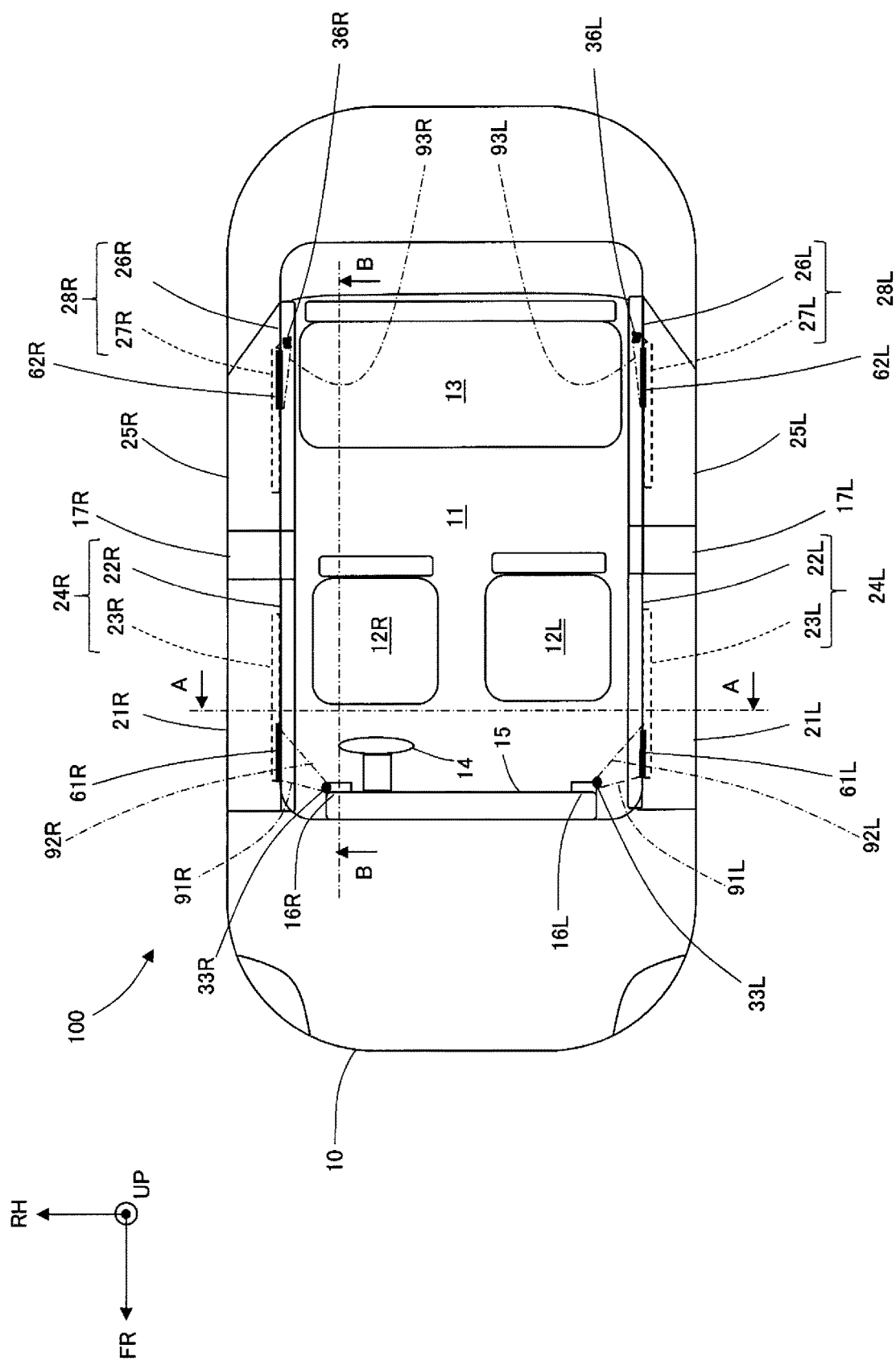
FIG. 1 is a plane view showing a passenger compartment of a vehicle on which a vehicle interior lighting device according to an embodiment is mounted.

Hereinafter, a vehicle interior lighting device 100 according to an embodiment will be described with reference to the drawings. In the drawings, arrows "FR," "UP," and "RH" respectively represent the forward direction (traveling direction), the upward direction, and the right direction of a vehicle 10. The directions opposite to the arrows "FR," "UP," and "RH" respectively represent the rearward direction, the downward direction, and the left direction of the vehicle. Hereinafter, when the description is given simply using front and rear, right and left, and up and down directions, unless otherwise specified, they respectively represent front and rear in the vehicle front-and-rear direction, right and left in the vehicle right-and-left direction (vehicle width direction), and up and down in the vehicle up-and-down direction.

Figure 2:
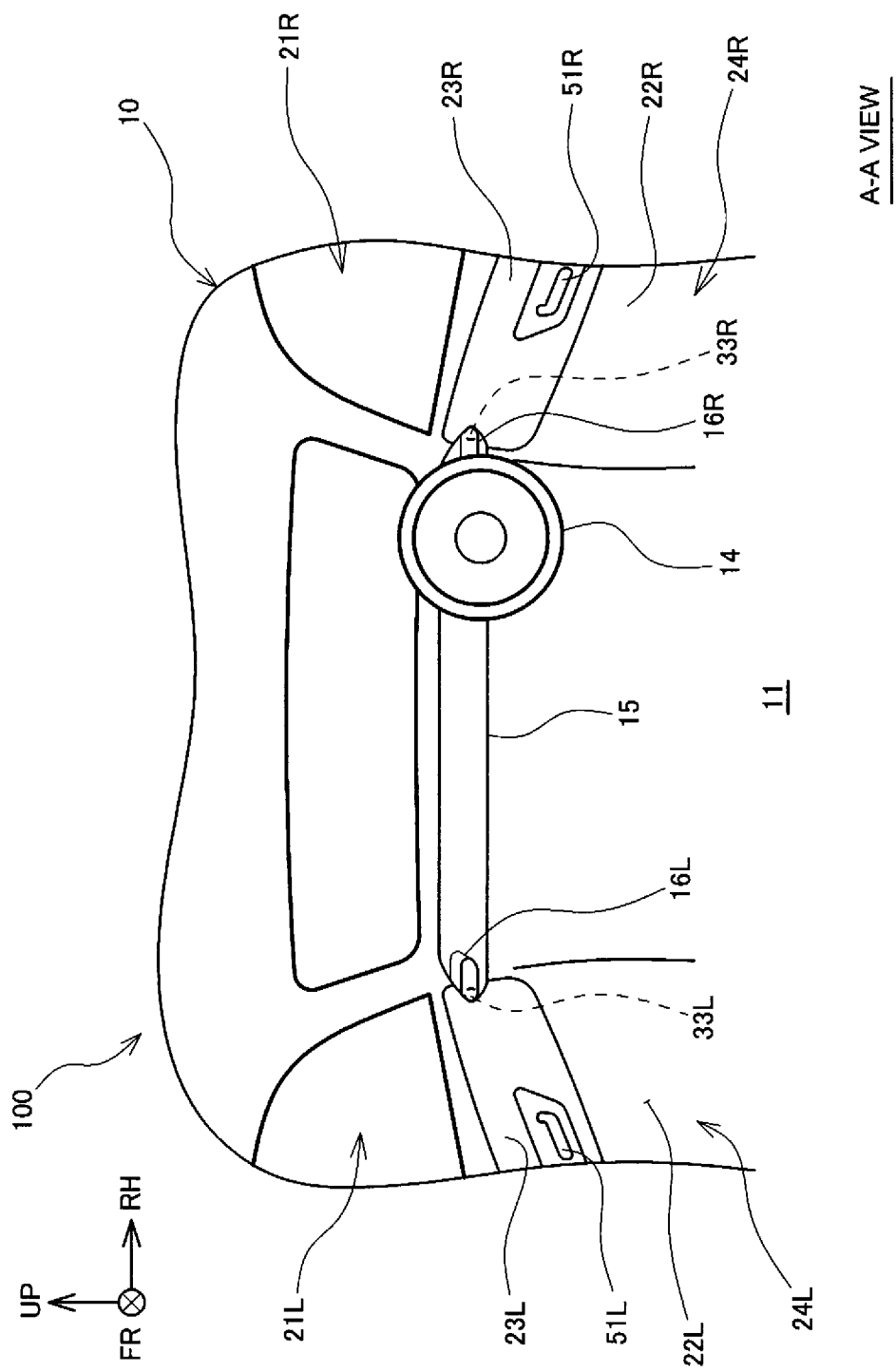
FIG. 2 is an elevated view of a front part of the passenger compartment of the vehicle on which the vehicle interior lighting device according to the embodiment is mounted, as viewed from inside the passenger compartment along A-A in FIG. 1.

First, the vehicle 10 on which the vehicle interior lighting device 100 according to the embodiment is mounted will be described with reference to FIGS. 1 to 3. As shown in FIG. 1, the vehicle 10 is a four-door sedan including left and right front doors 21L and 21R, left and right rear doors 25L and 25R, a driver seat 12R and passenger seat 12L at a front side of a passenger compartment 11, and a rear seat 13 at a rear side of the passenger compartment 11. In the passenger compartment 11, a steering wheel 14 is mounted in front of the driver seat 12R, and an instrument panel 15 is disposed in front of the steering wheel 14. The instrument panel 15 is an interior trim which is provided at the front side of the passenger compartment 11 and in which a speedometer and other driving instruments are arranged. As shown in FIGS. 1 and 2, left and right air outlet nozzles 16L and 16R for blowing air-conditioned air in the vehicle rearward direction toward the inside of the passenger compartment are arranged on right and left side ends of the instrument panel 15.

Figure 3:
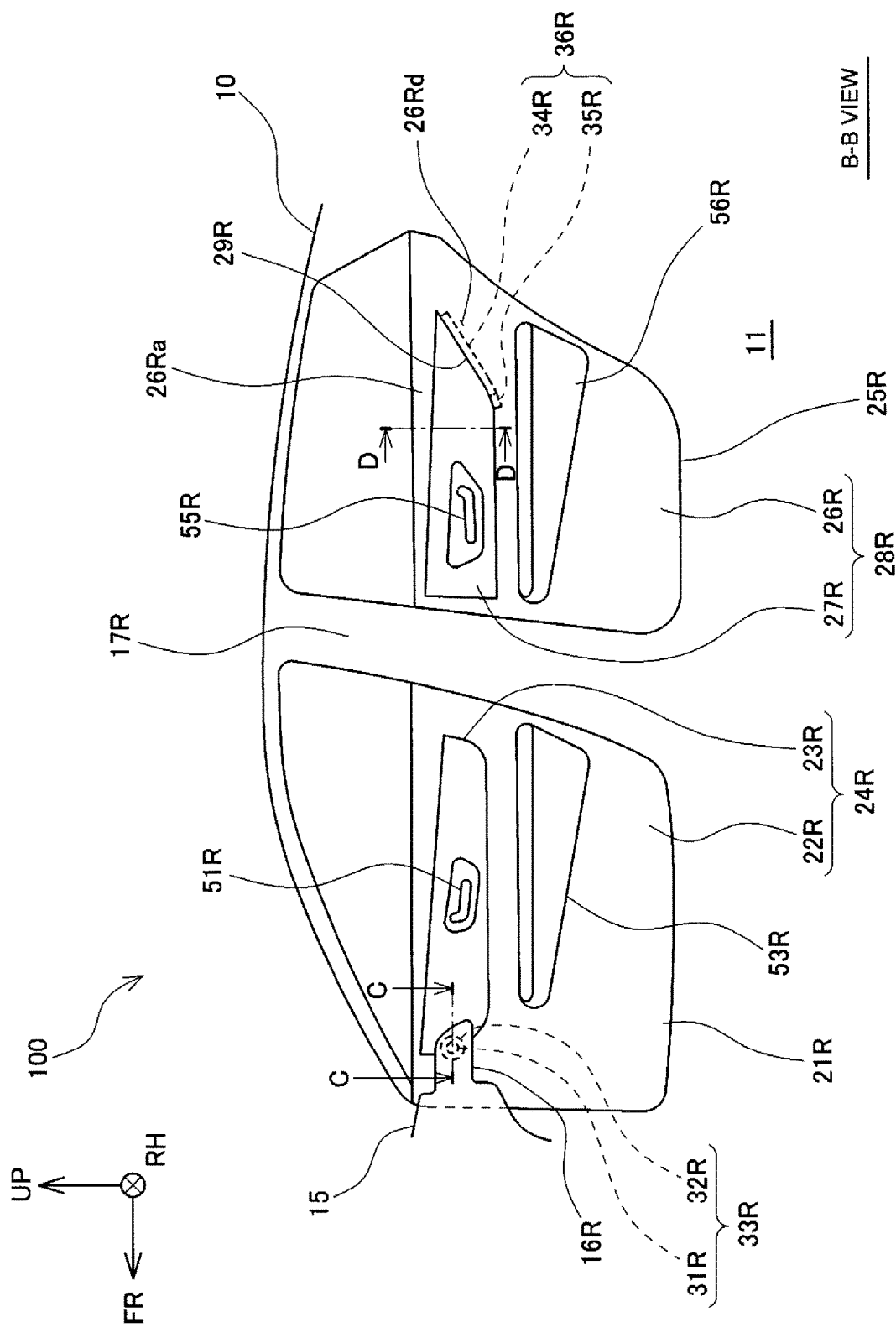
FIG. 3 is an elevated view of the right side of the passenger compartment of the vehicle on which the vehicle interior lighting device according to the embodiment is mounted, as viewed from inside the passenger compartment along B-B in FIG. 1.

As shown in FIG. 3, a front door trim 24R which is a front interior component is mounted on the passenger compartment side of the right front door 21R. The front door trim 24R is composed of a right front door trim body 22R which constitutes a right front inner surface of the passenger compartment 11, and a right front door decoration panel 23R mounted on a passenger compartment side surface of the right front door trim body 22R. A front lever 51R for opening and closing the front door 21R is mounted on the front door decoration panel 23R, and a front armrest 53R is provided on the lower side of the front door decoration panel 23R.

A rear door trim 28R which is a rear interior component is mounted on the passenger compartment side of the right rear door 25R. The rear door trim 28R is composed of a right rear door trim body 26R which constitutes a right rear inner surface of the passenger compartment 11, and a right rear door decoration panel 27R mounted on a passenger compartment side surface of the right rear door trim body 26R.

A rear lever 55R for opening and closing the rear door 25R is mounted on the rear door decoration panel 27R, and a rear armrest 56R is provided on the lower side of the rear door decoration panel 27R. The front door decoration panel 23R and the rear door decoration panel 27R are plate-shaped components extending in the vehicle front-and-rear direction and are arranged in alignment with each other in the vehicle front-and-rear direction.

The front door trim body 22R and the rear door trim body 26R are components made of resin and have, on their surfaces, a fine uneven pattern which does not reflect much light. On the other hand, the front door decoration panel 23R and the rear door decoration panel 27R are components having a smooth surface with a pattern, such as, for example, wood grain and are of higher reflectance than the front door trim body 22R and the rear door trim body 26R.

The left front door 21L is symmetrical with the right front door 21R and has a left front door trim 24L composed of a left front door trim body 22L and a left front door decoration panel 23L mounted on the interior side of the passenger compartment. The front door decoration panel 23L has a front lever 51L (see FIG. 2) for opening and closing the left front door 21L. The left rear door 25L is also symmetrical with the right rear door 25R and has a left rear door trim 28L composed of a left rear door trim body 26L and a left rear door decoration panel 27L mounted on the interior side of the passenger compartment. The rear door decoration panel 27L has a rear lever (not shown) for opening and closing the left rear door 25L.

In addition, left and right center pillars 17L and 17R are respectively arranged between the left front and rear doors 21L and 25L and between the right front and rear doors 21R and 25R.

Returning to FIG. 1 again, the vehicle interior lighting device 100 mounted on the vehicle 10 will be described. The vehicle interior lighting device 100 is composed of front light-emitting sections 33L and 33R respectively mounted on the left and right sides at the front side of the passenger compartment 11 and rear light-emitting sections 36L and 36R respectively mounted on the left and right sides at the rear side of the passenger compartment 11. The front light-emitting sections 33L and 33R emit light obliquely outward toward the vehicle rear side while the vehicle 10 is moving or stopped, to thereby illuminate the front portions of the front door trims 24L and 24R, which are the front interior components. The rear light-emitting sections 36L and 36R also emit light obliquely outward toward the vehicle front side while the vehicle 10 is moving or stopped, to thereby illuminate the rear portions of the rear door trims 28L and 28R, which are the rear interior components.

Figure 4:
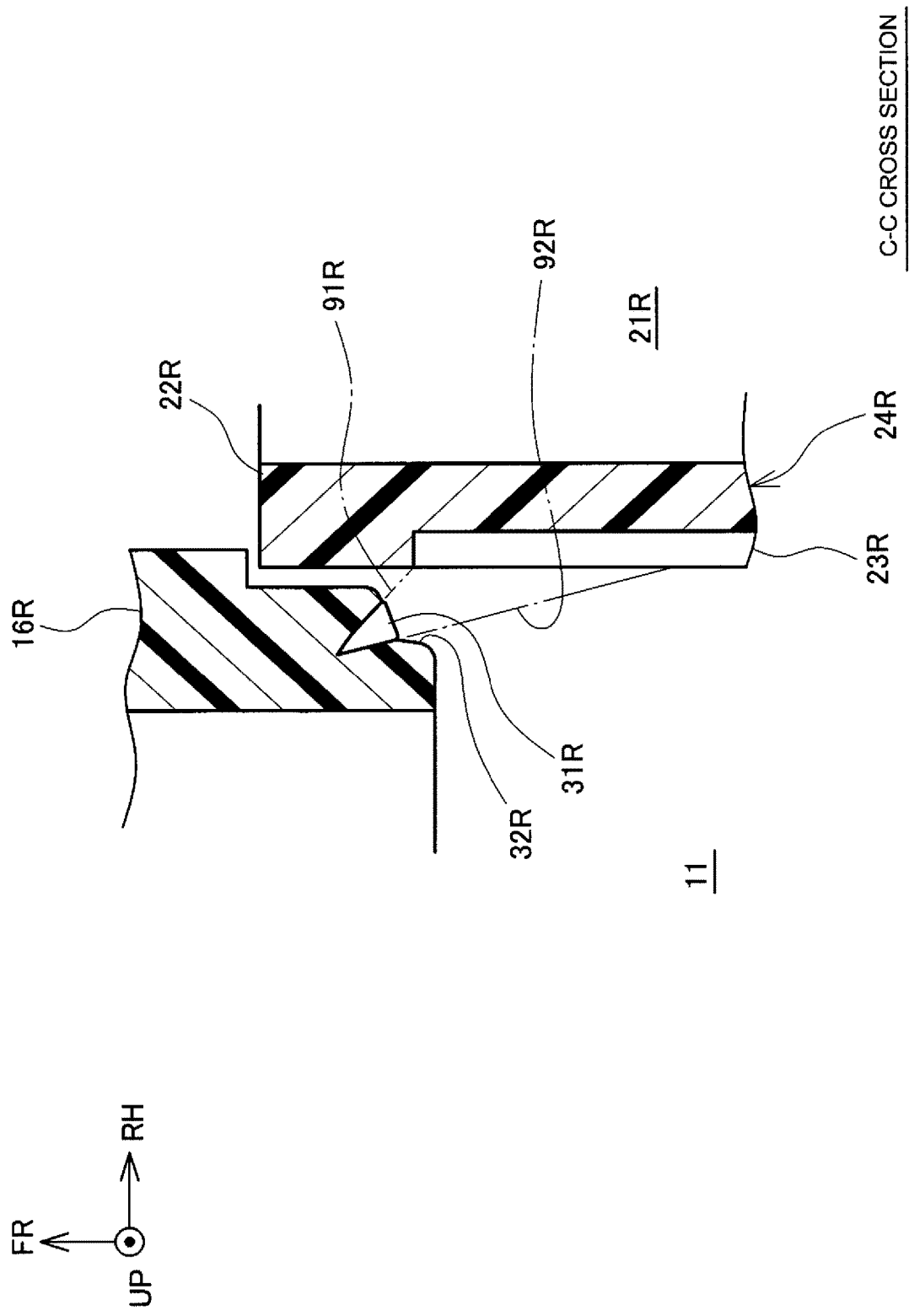
FIG. 4 is a cross-sectional view of a front light-emitting section taken along C-C in FIG. 3.

The right front light-emitting section 33R will now be described. As shown in FIGS. 1 and 2, the right front light-emitting section 33R is mounted on a right outer side portion of the air outlet nozzle 16R located at the right end of the instrument panel 15. As shown in FIGS. 3 and 4, a mortise-shaped depression 32R is provided in a vehicle-width-direction outer-side portion of the right air outlet nozzle 16R of the instrument panel 15. The mortise-shaped depression 32R is enlarged obliquely outward toward the vehicle rear side and has a light emitting element 31R therein. Light emitted from the light emitting element 31R is guided by a tapered surface of the mortise-shaped depression 32R and travels obliquely toward the right rear side of the vehicle 10 along optical paths 91R and 92R indicated by single-dotted lines in FIGS. 1 and 4 and illuminates the front door decoration panel 23R of the right front door 21R and the front portion of the front door trim body 22R around it.

The light emitting element 31R and the depression 32R constitute the front light-emitting section 33R. The color of light emitted from the light emitting element 31R may be, for example, light bulb color or daylight color, or may be green, blue, or other colors.

Figure 7:
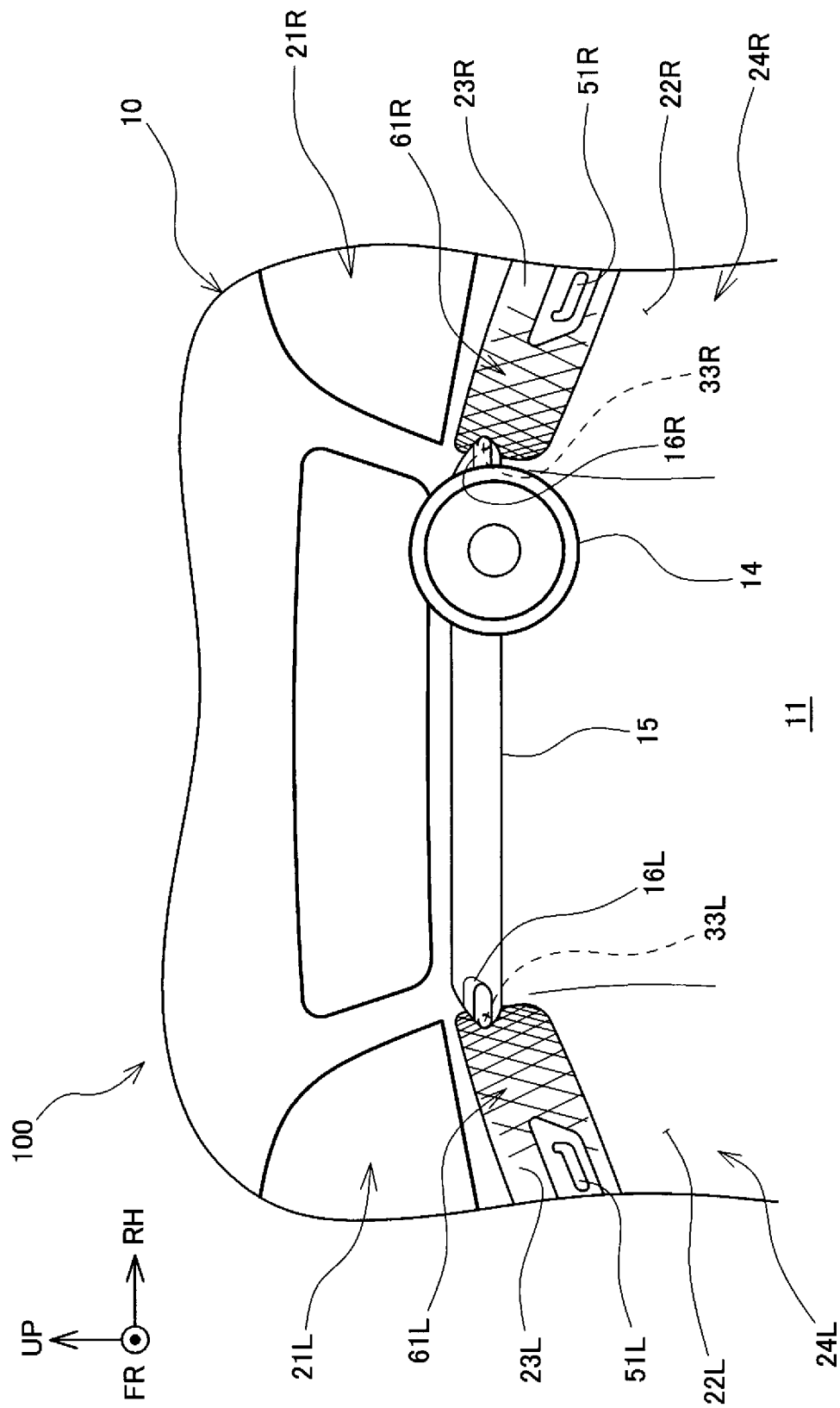
FIG. 7 is an elevated view of the front part of the passenger compartment in FIG. 2 with the front light-emitting section turned on, as viewed from inside the passenger compartment.

As explained above, the front door trim body 22R is a component made of resin and has, on its surface, a fine uneven pattern, which does not reflect much light. On the other hand, the front door decoration panel 23R has a smooth surface and has a reflectance higher than the front door trim body 22R. Therefore, when light illuminates the front door decoration panel 23R and the front portion of the front door trim body 22R around it, the front door trim body 22R does not appear to glow much, and only the front portion of the front door decoration panel 23R appears to glow as indicated by cross-hatching in FIG. 7. The area indicated by the cross-hatching in FIG. 7 will be referred to as a right front illuminated area 61R. As explained above, the front door decoration panel 23R is a strip-shaped component extending in the vehicle front-and-rear direction, and the front illuminated area 61R thus becomes a strip-shaped area extending from the front toward the rear of the vehicle 10. The light emitted from the light emitting element 31R travels obliquely toward the vehicle right rear side, and therefore, the brightness in the front illuminated area 61R gradually decreases toward the rear side of the vehicle 10, and the light fades out near in front of the front lever 51R. This causes passengers to perceive the front illuminated area 61R as a strip of light emitted from the front toward the rear of the vehicle 10.

The left front light-emitting section 33L is symmetrical with the right front light-emitting section 33R. It is composed of a depression (not shown) provided in a vehicle-width-direction outer-side portion of the left air outlet nozzle 16L of the instrument panel 15, and a light emitting element (not shown) mounted in the depression. Light emitted from the light-emitting element of the left front light-emitting section 33L travels obliquely toward the vehicle left rear side of the vehicle 10 along the optical paths 91L and 92L indicated by single-dotted lines in FIG. 1 and illuminates the front door decoration panel 23L of the left front door 21L and the front portion of the front door trim body 22L around it, thereby providing a left front illuminated area 61L indicated by cross-hatching in FIG. 7. The range and brightness of the left front illuminated area 61L is the same as that of the right front illuminated area 61R.

Next, the right rear light-emitting section 36R will be described. As shown in FIG. 3, the right rear light-emitting section 36R is mounted inside a vehicle rear portion 26Rd of the rear door trim body 26R located at the vehicle rear side of the right rear door decoration panel 27R.

Figure 5:
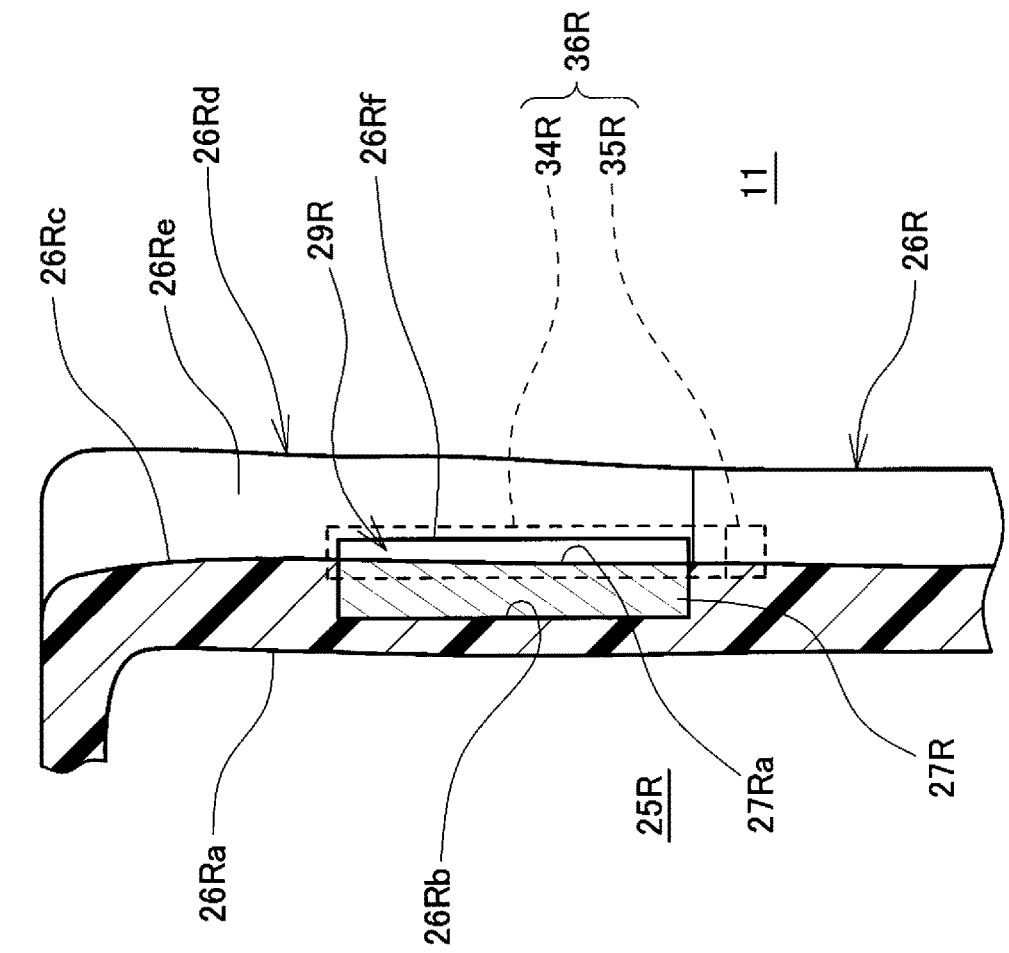
FIG. 5 is a cross-sectional view of a rear light-emitting section as viewed from the vehicle front side, taken along C-C in FIG. 3.
Figure 6:
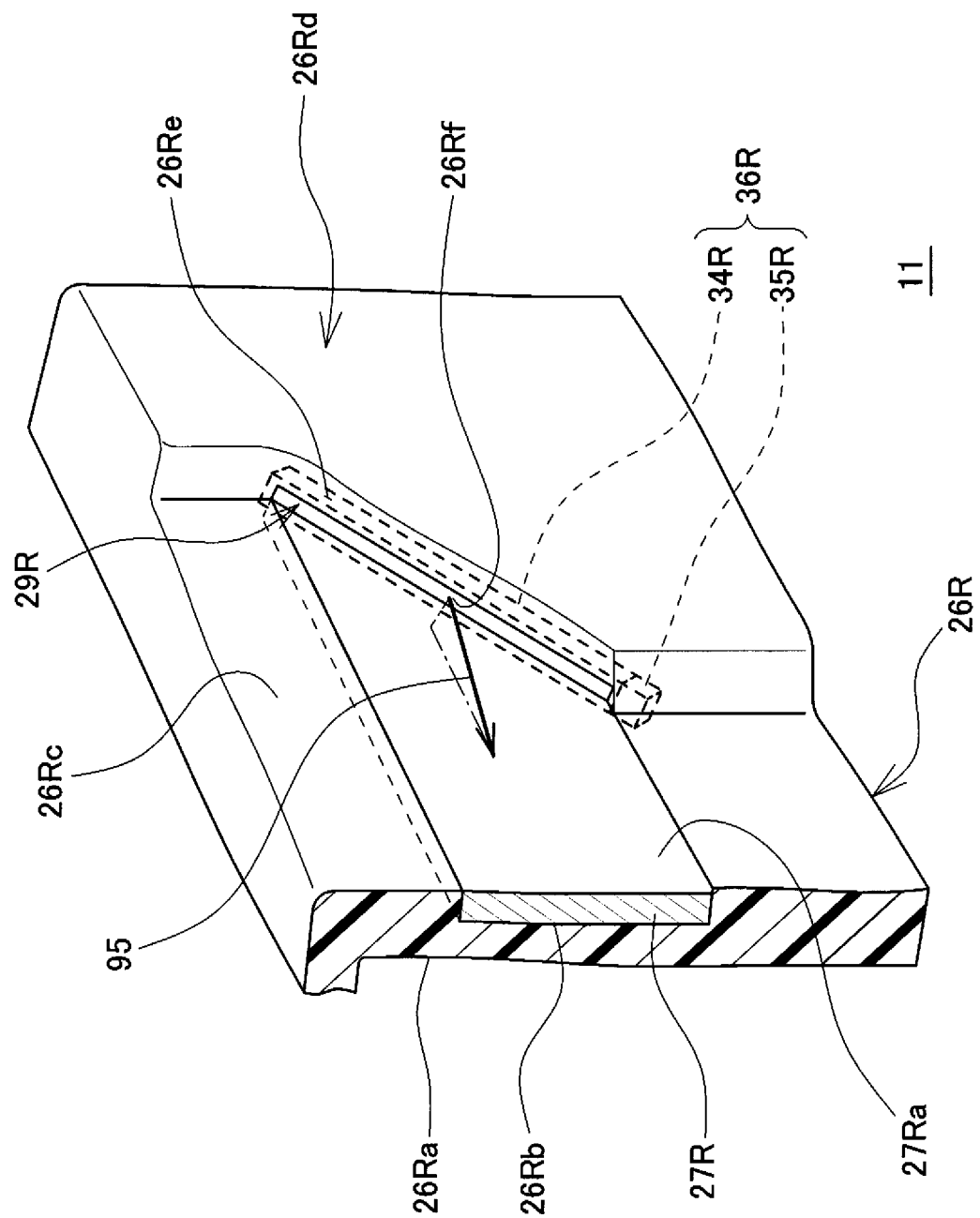
FIG. 6 is a cross-sectional view of the rear light-emitting section as viewed from the vehicle front side.

As shown in FIGS. 5 and 6, a general portion 26Ra of the rear door trim body 26R on which the rear door decoration panel 27R is mounted has a groove 26Rb into which the rear door decoration panel 27R is fitted. The rear door decoration panel 27R is fitted into the groove 26Rb so that its surface 27Ra on the side of the passenger compartment 11 is as high as a surface 26Rc at the upper side of the rear door trim body 26R on the side of the passenger compartment 11. The vehicle rear portion 26Rd of the rear door trim body 26R protrudes toward the inside of the passenger compartment 11 more than the surface 27Ra of the rear door decoration panel 27R, and a longitudinal groove-shaped notch 26Rf is formed in a vehicle front side surface 26Re of the vehicle rear portion 26Rd near the surface 27Ra of the rear door decoration panel 27R so as to be recessed toward the passenger compartment 11 side. The notch 26Rf forms a gap 29R between the vehicle rear portion 26Rd of the rear door trim body 26R and the surface 27Ra of the rear door decoration panel 27R.

Figure 8:
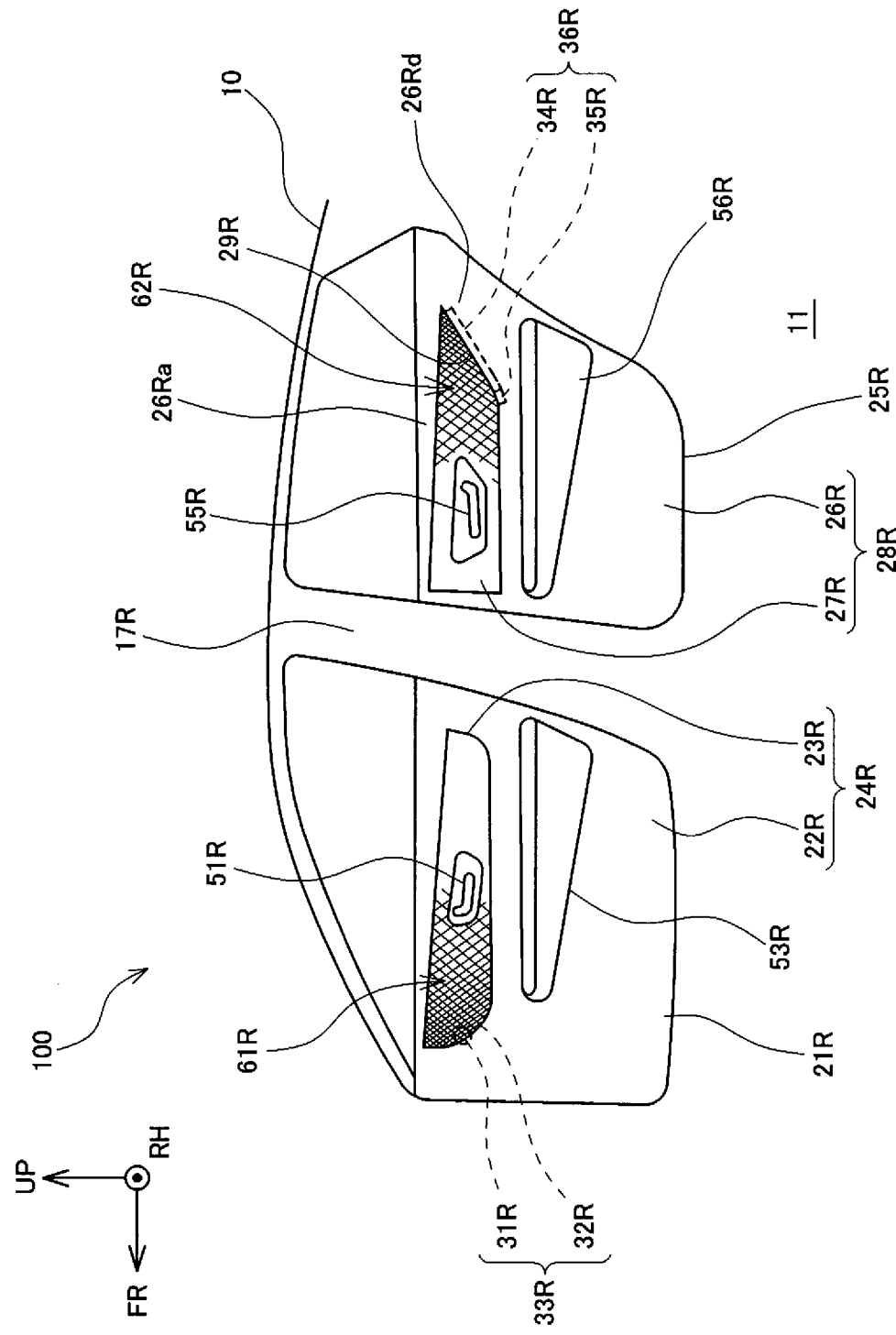
FIG. 8 is an elevated view of the right side of the passenger compartment in FIG. 3 with the front and rear light-emitting sections turned on, as viewed from inside the passenger compartment.

The rear light-emitting section 36R is composed of a light guide rod 34R and a light-emitting element 35R disposed at one end of the light guide rod 34R. The light guide rod 34R propagates light incident from the light emitting element 35R disposed at its one end internally and emits the light from its side. As shown in FIGS. 3, 5, and 6, the light guide rod 34R is mounted inside the rear door trim body 26R so that its longitudinal direction extends along the gap 29R between the rear door trim body 26R and the surface 27Ra of the rear door decoration panel 27R. The light guide rod 34R has fine indentations extending in the vehicle front-and-rear direction to emit light in a horizontal direction. In addition, the light guide rod 34R is mounted at an angle such that its light-emitting surface faces obliquely outward toward the vehicle front side. As a result, the light guide rod 34R emits light, which is incident from the light emitting element 35R, in a horizontal direction from the gap 29R as shown by an arrow 95 in FIG. 6 so that it travels obliquely outward toward the vehicle front side. The emitted light travels obliquely toward the right front side of the vehicle 10 along an optical path 93R indicated by a single dotted line in FIG. 1 and illuminates the rear portion of the rear door decoration panel 27R of the right rear door 25R, as indicated by cross-hatching in FIG. 8. The area indicated by cross-hatching in FIG. 8 will be referred to as a right rear illuminated area 62R. The color of light emitted from the light emitting element 35R may be, for example, light bulb color or daylight color, or may be green, blue, or other colors.

As explained above, the rear door decoration panel 23R is a strip-shaped component with a smooth surface extending in the vehicle front-and-rear direction, and the front illuminated area 62R thus becomes a strip-shaped area extending from the rear toward the front of the vehicle 10. The light emitted from the rear light-emitting section 36R travels obliquely toward the right front side of the vehicle 10, and therefore, the brightness in the rear illuminated area 62R gradually decreases toward the front side of the vehicle 10, and the light fades out near behind the rear lever 55R. This causes the passengers to perceive the rear illuminated area 62R as a strip of light emitted from the rear toward the front of the The rear door trim body 26R has a fine uneven pattern on its surface and does not reflect much light. Even when light from the rear light-emitting section 36R hits the rear door trim body 26R, it does not appear to glow much, and only the rear portion of the rear door decoration panel 27R appears to glow like a strip as indicated by the cross-hatching in FIG. 7.

The left rear light-emitting section 36L is symmetrical with the right rear light-emitting section 36R and is composed of a light guide rod (not shown) and a light-emitting element (not shown). The light guide rod of the rear light-emitting section 36L emits light incident from the light-emitting element obliquely outward toward the vehicle front side from a gap (not shown) between the rear door decoration panel 27L and the vehicle rear portion (not shown) of the rear door trim body 26L. The emitted light travels obliquely toward the left front side of the vehicle 10 along an optical path 93L indicated by a single-dotted line in FIG. 1 and illuminates the rear portion of the left rear door decoration panel 23L, thereby providing a left rear illuminated area 62L as shown in FIG. 1. The range and brightness of the left rear illuminated area 62L is the same as that of the right rear illuminated area 62R.

As explained above, in the vehicle interior lighting device 100, the four light-emitting sections; that is, the left and right front light-emitting sections 33L, 33R and the left and right rear light-emitting sections 36L, 36R, are arranged at the four corners of the passenger compartment 11, to thereby respectively provide the left and right front illuminated areas 61L, 61R and the left and right rear illuminated areas 62L, 62R. The right front illuminated area 61R and the right rear illuminated area 62R and the left front illuminated area 61L and the left rear illuminated area 62L allow the passengers to perceive visually the expanse of the passenger compartment 11 in the vehicle front-and-rear direction. Furthermore, the left and right front illuminated areas 61L, 61R and the left and right rear illuminated areas 62L, 62R allow the passengers to perceive visually the expanse of the passenger compartment 11 in the vehicle width direction. The vehicle interior lighting device 100 can thus allow the passengers to have a visual sensation as if the passenger compartment 11 were expanded. In addition, by indirectly illuminating the four corners of the passenger compartment 11 comprising the left and right front light-emitting sections 33L, 33R and the left and right rear light-emitting sections 36L, 36R, it is possible to produce a space in which the passengers can feel comfortable and relaxed.

The left and right front illuminated areas 61L and 61R are strip-like areas extending from the front toward the rear of the vehicle 10. The brightness in the area gradually decreases toward the rear side of the vehicle 10 and fades out. This causes the passengers to perceive the area as a strip of light emitted from the front toward the rear of the vehicle 10. The left and right rear illuminated areas 62L and 62R are also strip-like areas extending from the rear toward the front of the vehicle 10. The brightness in the area gradually decreases toward the front side of the vehicle 10 and fades out. This causes the passengers to perceive the area as a strip of light emitted from the rear toward the front of the vehicle 10. Areas of no light are then created between the front illuminated areas 61L, 61R and the rear illuminated areas 62L, 62R. This can allow the passengers to have a stronger visual sensation as if the passenger compartment 11 were expanded in the front-and-back direction.

Thus, the vehicle interior lighting device 100 can allow the passengers to perceive visually the expanse of the passenger compartment 11 and produce a space in which the passengers can feel comfortable and relaxed.

Although, in the above description, the vehicle interior lighting device 100 has been described as being mounted on the four-door sedan vehicle 10, this is not limiting, and, for example, it may be mounted on a two-door vehicle. In this case, the rear light-emitting sections 36L and 36R may be mounted not in the rear doors 25L and 25R but in interior components constituting sidewalls of the passenger compartment 11 behind the front doors 21L and 21R so that they can illuminate rear portions of those interior components. Furthermore, when the vehicle interior lighting device 100 is mounted on a vehicle without doors on the right side, such as, for example, a bus, the front light-emitting section 33R and the rear light-emitting section 36R may be mounted in an interior component constituting a right side surface of the passenger compartment 11 so that they can illuminate the right front and rear portions of the passenger compartment 11.

Although, in the above description, the front light-emitting sections 33L and 33R have been described as being respectively arranged at the left and right side ends of the instrument panel 15 at the front side of the vehicle, this is not limiting, and they may be arranged on side end surfaces of other interior components, as long as they can illuminate the front portions of the front door trims 24L and 24R, which are the front interior components.

Next, a vehicle interior lighting device 200 according to another embodiment will be described with reference to FIG. 9. The portions that are identical to those included in the vehicle interior lighting device 100 described above with reference to FIGS. 1 and 8 are assigned the same reference signs, and their repeated descriptions will be omitted. First, a right front light-emitting section 39R of the passenger compartment 11 will be described.

Figure 9:
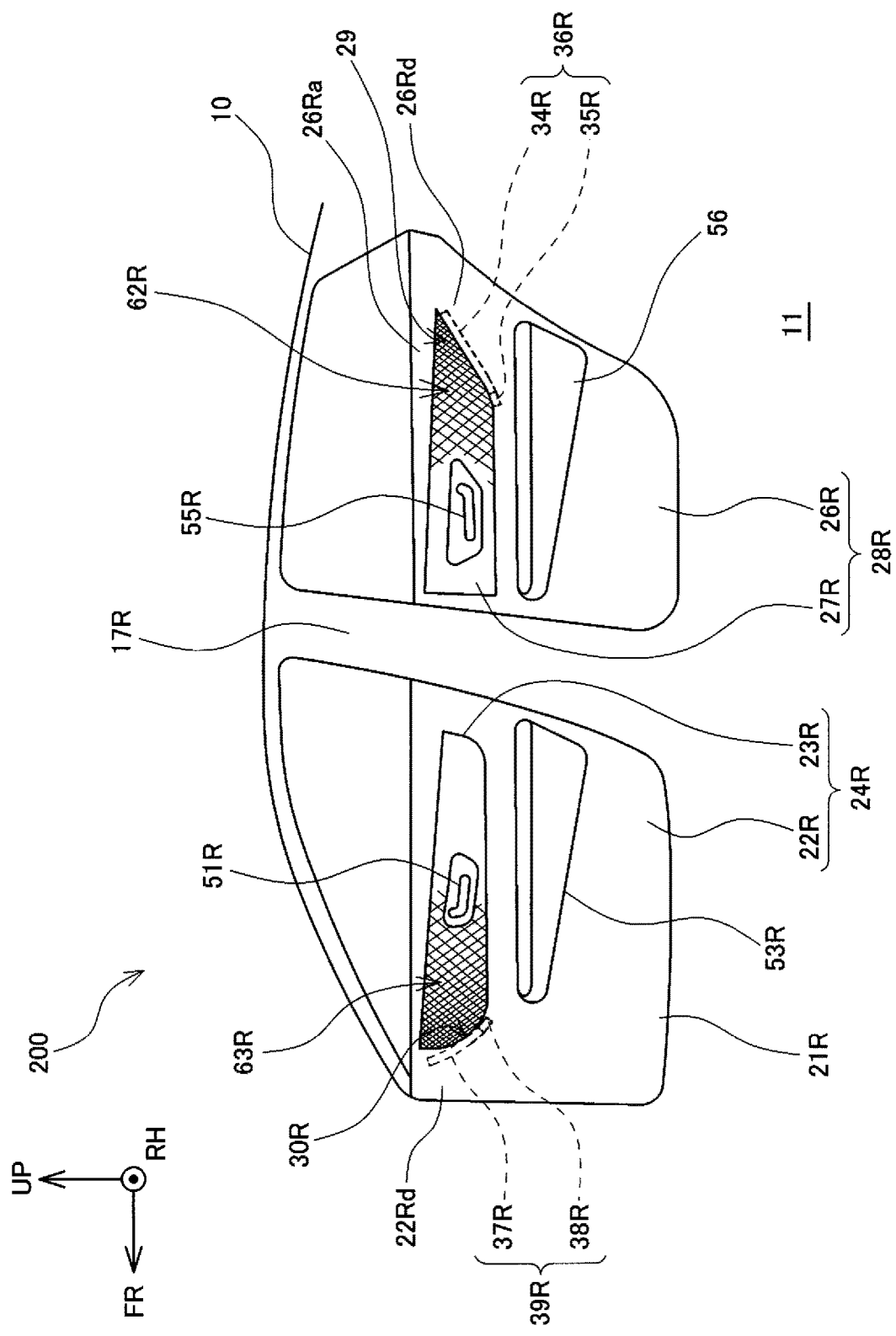
FIG. 9 is an elevated view of the right side of the passenger compartment of the vehicle on which a vehicle interior lighting device according to another embodiment is mounted, as viewed from inside the passenger compartment.

As shown in FIG. 9, in the vehicle interior lighting device 200, the front light-emitting section 39R is composed of a light guide rod 37R and a light-emitting element 38R, like the rear light-emitting section 36R. The structure of the front light-emitting section 39R is such that the rear light-emitting section 36R is flipped back and forth.

The front light-emitting section 39R is mounted inside a vehicle front portion 22Rd of the front door trim body 22R located at the vehicle front side of the front door decoration panel 23R, to thereby emit light obliquely outward toward the vehicle rear side from a gap 30R between the front door decoration panel 23R and the front door trim body 22R. The front light-emitting section 39R provides a front illuminated area 63R that is a strip-like area extending from the front toward the rear of the vehicle 10 on the front portion of the front door decoration panel 23R.

A left front light-emitting section (not shown) of the passenger compartment 11 has a symmetrical structure with the right front light-emitting section 39R, and emits light obliquely outward toward the vehicle rear side from a gap (not shown) between the front door decoration panel 23L and the front door trim body 22L, to thereby provide a front illuminated area (not shown) that is a strip-like area extending from the front toward the rear on the front portion of the front door decoration panel 23L.

Like the vehicle interior lighting device 100, the vehicle interior lighting device 200 can allow the passengers to have a visual sensation as if the passenger compartment 11 were expanded and produce a space in which the passengers can feel comfortable and relaxed by indirectly lighting the four corners of the passenger compartment 11.

The invention claimed is:

1. A vehicle interior lighting device comprising:
a plurality of front light-emitting sections that are provided at a front side of a passenger compartment and illuminate front portions of front interior components disposed on right and left sides at the front side of the passenger compartment; and
a plurality of rear light-emitting sections that are provided at a rear side of the passenger compartment and illuminate rear portions of rear interior components disposed on right and left sides at the rear side of the passenger compartment, wherein:
the front light-emitting sections are disposed at right and left side ends of an interior trim provided at the front side of the passenger compartment and emit light obliquely outward toward a vehicle rear side to illuminate the front portions of the front interior components,
the rear light-emitting sections are disposed at the vehicle rear side of the rear interior components and emit light obliquely outward toward a vehicle front side to illuminate the rear portions of the rear interior components, the front interior components are front door trims mounted on the passenger compartment side of right and left front doors, the rear interior components are rear door trims mounted on the passenger compartment side of right and left rear doors, the front door trim includes a front door trim body that constitutes an inner surface of a corresponding one of the right or left front doors of the passenger compartment and a front door decoration panel mounted on a passenger compartment side surface of the front door trim body, the rear door trim includes a rear door trim body that constitutes an inner surface of a corresponding one of the right or left rear doors of the passenger compartment and a rear door decoration panel mounted on a passenger compartment side surface of the rear door trim body, the left front door decoration panel and the left rear door decoration panel are arranged in alignment with each other in the vehicle front-and-rear direction, the right front door decoration panel and the right rear door decoration panel are arranged in alignment with each other in the vehicle front-and-rear direction, the front light-emitting sections illuminate front portions of the front door decoration panels, and the rear light-emitting sections illuminate rear portions of the rear door decoration panels.

2. The vehicle interior lighting device according to claim 1, wherein the rear light-emitting section is mounted inside a vehicle rear portion of the rear door trim body located at the vehicle rear side of the rear door decoration panel and emits light obliquely outward toward the vehicle front side from a gap between the rear door decoration panel and the rear door trim body.

3. The vehicle interior lighting device according to claim 2, wherein each of the front door decoration panel and the rear door decoration panel is a strip-shaped component that has a reflectance higher than the front door trim body and the rear door trim body and extends in the vehicle front-and-rear direction.

4. The vehicle interior lighting device according to claim 3, wherein
the interior trim is an instrument panel disposed at the front side of the passenger compartment,
the instrument panel has air outlet nozzles projecting at its right and left side ends toward the inside of the passenger compartment and mortise-shaped depressions provided in vehicle-width-direction outer-side portions of the air outlet nozzles,
the mortise-shaped depressions are enlarged obliquely outward toward the vehicle rear side, and
the front light-emitting sections are light-emitting elements provided in the depressions.

5. The vehicle interior lighting device according to claim 2, wherein
the interior trim is an instrument panel disposed at the front side of the passenger compartment,
the instrument panel has air outlet nozzles projecting at its right and left side ends toward the inside of the passenger compartment and mortise-shaped depressions provided in vehicle-width-direction outer-side portions of the air outlet nozzles,
the mortise-shaped depressions are enlarged obliquely outward toward the vehicle rear side, and
the front light-emitting sections are light-emitting elements provided in the depressions.

6. The vehicle interior lighting device according to claim 1, wherein each of the front door decoration panel and the rear door decoration panel is a strip-shaped component that has a reflectance higher than the front door trim body and the rear door trim body and extends in the vehicle front-and-rear direction.

7. The vehicle interior lighting device according to claim 6, wherein
the interior trim is an instrument panel disposed at the front side of the passenger compartment,
the instrument panel has air outlet nozzles projecting at its right and left side ends toward the inside of the passenger compartment and mortise-shaped depressions provided in vehicle-width-direction outer-side portions of the air outlet nozzles,
the mortise-shaped depressions are enlarged obliquely outward toward the vehicle rear side, and
the front light-emitting sections are light-emitting elements provided in the depressions.

8. The vehicle interior lighting device according to claim 1, wherein
the interior trim is an instrument panel disposed at the front side of the passenger compartment,
the instrument panel has air outlet nozzles projecting at its right and left side ends toward the inside of the passenger compartment and mortise-shaped depressions provided in vehicle-width-direction outer-side portions of the air outlet nozzles,
the mortise-shaped depressions are enlarged obliquely outward toward the vehicle rear side, and
the front light-emitting sections are light-emitting elements provided in the depressions.

9. A vehicle interior lighting device comprising:
a plurality of front light-emitting sections that are provided at a front side of a passenger compartment and illuminate front portions of front interior components disposed on right and left sides at the front side of the passenger compartment; and
a plurality of rear light-emitting sections that are provided at a rear side of the passenger compartment and illuminate rear portions of rear interior components disposed on right and left sides at the rear side of the passenger compartment, wherein:
the front light-emitting sections are disposed at right and left side ends of an interior trim provided at the front side of the passenger compartment and emit light obliquely outward toward a vehicle rear side to illuminate the front portions of the front interior components,
the rear light-emitting sections are disposed at the vehicle rear side of the rear interior components and emit light obliquely outward toward a vehicle front side to illuminate the rear portions of the rear interior components,
the interior trim is an instrument panel disposed at the front side of the passenger compartment,
the instrument panel has air outlet nozzles projecting at its right and left side ends toward the inside of the passenger compartment and mortise-shaped depressions provided in vehicle-width-direction outer-side portions of the air outlet nozzles,
the mortise-shaped depressions are enlarged obliquely outward toward the vehicle rear side, and
the front light-emitting sections are light-emitting elements provided in the depressions.

10. A vehicle interior lighting device comprising:
a plurality of front light-emitting sections that are provided at a front side of a passenger compartment and illuminate front portions of front interior components disposed on right and left sides at the front side of the passenger compartment; and a plurality of rear light-emitting sections that are provided at a rear side of the passenger compartment and illuminate rear portions of rear interior components disposed on right and left sides at the rear side of the passenger compartment, wherein:

the front light-emitting sections are disposed at the vehicle front side of the front interior components and emit light obliquely outward toward the vehicle rear side to illuminate the front portions of the front interior components, the rear light-emitting sections are disposed at the vehicle rear side of the rear interior components and emit light obliquely outward toward the vehicle front side to illuminate the rear portions of the rear interior components, the front interior components are front door trims mounted on the passenger compartment side of right and left front doors, the rear interior components are rear door trims mounted on the passenger compartment side of right and left rear doors, the front door trim includes a front door trim body that constitutes an inner surface of a corresponding one of the right or left front doors of the passenger compartment and a front door decoration panel mounted on a passenger compartment side surface of the front door trim body, the rear door trim includes a rear door trim body that constitutes an inner surface of a corresponding one of the right or left rear doors of the passenger compartment and a rear door decoration panel mounted on a passenger compartment side surface of the rear door trim body, the left front door decoration panel and the left rear door decoration panel are arranged in alignment with each other in the vehicle front-and-rear direction, the right front door decoration panel and the right rear door decoration panel are arranged in alignment with each other in the vehicle front-and-rear direction, the front light-emitting section is mounted inside a vehicle front portion of the front door trim body located at the vehicle front side of the front door decoration panel and emits light obliquely outward toward the vehicle rear side from a gap between the front door decoration panel and the front door trim body to illuminate the front portion of the front door decoration panel, and the rear light-emitting section is mounted inside a vehicle rear portion of the rear door trim body located at the vehicle rear side of the rear door decoration panel and emits light obliquely outward toward the vehicle front side from a gap between the rear door decoration panel and the rear door trim body to illuminate the rear portion of the rear door decoration panel.

11. The vehicle interior lighting device according to claim 10, wherein each of the front door decoration panel and the rear door decoration panel is a strip-shaped component that has a reflectance higher than the front door trim body and the rear door trim body and extends in the vehicle front-and-rear direction.

\* \* \* \* \*